United States Patent [19]

Sempolinski et al.

[11] Patent Number: 5,332,702
[45] Date of Patent: Jul. 26, 1994

[54] LOW SODIUM ZIRCON REFRACTORY AND FUSED SILICA PROCESS

[75] Inventors: Daniel R. Sempolinski; Latha I. Swaroop, both of Painted Post, N.Y.

[73] Assignee: Corning Incorporated, Corning, N.Y.

[21] Appl. No.: 48,454

[22] Filed: Apr. 16, 1993

[51] Int. Cl.$^5$ .............................................. C04B 35/48
[52] U.S. Cl. ...................................... 501/106; 373/27; 373/33
[58] Field of Search ...................... 501/106; 373/27, 33

[56] References Cited

U.S. PATENT DOCUMENTS 2,239,551  4/1941  Dalton et al. .
2,272,342  2/1942  Hyde .
3,351,334  11/1967  Reinker .
5,043,002  8/1990  Dobbins et al. .
5,124,287  6/1992  Wehrenberg et al. .............. 501/106

*Primary Examiner*—Karl Group
*Attorney, Agent, or Firm*—Milton M. Peterson; Clinton S. Janes, Jr.

[57] ABSTRACT

A fired, porous, zircon refractory body consisting essentially of zircon and having a sodium ion content, as an impurity, of less than 30 ppm. A furnace for making fused silica constructed with a crown and cup of such zircon refractory, and a method of making fused silica using such furnace.

5 Claims, 2 Drawing Sheets

LOW SODIUM ZIRCON REFRACTORY AND FUSED SILICA PROCESS

FIELD OF THE INVENTION

The field is zircon refractory bodies, a furnace constructed in part of such bodies, and use of such furnace in the production of metal oxides from vaporous reactants.

BACKGROUND OF THE INVENTION

Zircon ($ZrSiO_4$) and zirconia ($ZrO_2$) are recognized as highly refractory materials. Accordingly, shaped bodies of such materials, such as brick, are frequently employed in conjunction with high temperature processes. Zircon is more commonly the choice in view of its stability, ease of fabrication and lower cost.

One such high temperature process is production and/or depositing of metal oxides from vaporous reactants. Such oxides may be produced by flame hydrolysis or pyrolysis of a precursor in the form of a vapor, or carried by a vapor carrier. A widely used process is production of high quality fused silica by either pyrolysis or hydrolysis of silicon tetrachloride ($SiCl_4$). Early patents disclosing such processes are U.S. Pat. Nos. 2,239,551 (Nordberg) and No. 2,272,342 (Hyde).

A commercial application of flame hydrolysis involves forming and depositing particles of fused silica to form large bodies (boules). Such boules may be used individually, or may be finished and integrated together into large optical bodies, such as telescope mirrors. In this procedure, $SiCl_4$ is hydrolyzed, and the hydrolyzed vapor is passed into a flame to form molten particles of fused silica. The particles are continuously deposited on a bait or in a crucible, known as a cup, to form a boule.

The hydrolysis or pyrolysis of halides, in particular chlorides such as $SiCl_4$, produces a very strong acid by-product, HCl. This by-product is highly detrimental to the processing equipment, including burners and deposition substrates. More important, however, it creates a very serious environmental problem, unless controlled by an emission abatement system. While such systems are available, they tend to be prohibitively expensive.

Accordingly, it has been proposed, in U.S. Pat. No. 5,043,002 (Dobbins et al.), to employ a halide-free, silicon-containing compound as a substitute for $SiCl_4$. In particular, the patent proposes using a polymethylsiloxane, such as octamethylcyclotetrasiloxane, to provide the vaporous reactant for the hydrolysis or pyrolysis process.

Customer requirements make it imperative, in making such a process change, to maintain composition and/or physical properties of the resulting product essentially unchanged. Unfortunately, when the substitution proposed in the Dobbins et al. patent was introduced, changes did occur. In particular, a ten-fold increase in sodium ion contamination was encountered. Also, a substantial change occurred in the UV transmission of the fused silica produced.

Our present invention is predicated on providing remedies for the indicated problems. It is further predicated on providing improved equipment and process for producing fused silica by hydrolysis or pyrolysis of a vapor reactant. In particular, the invention is predicated on providing a method and means for producing a fused silica product that has a sodium ion contamination level below 100 parts per billion (ppb) while avoiding chloride emissions.

SUMMARY OF THE INVENTION

One aspect of our invention is a fired, refractory body consisting essentially of zircon and having a sodium content not over 30 ppm. In one embodiment, the refractory body is a component in a furnace for producing fused silica.

Another aspect of the invention is a method of producing fused silica which comprises constructing a furnace in which at least the crown of the furnace is composed of a fired, zircon refractory body having a sodium content not over 30 ppm, mounting a burner system above the furnace, forming a vapor stream containing a precursor of $SiO_2$, passing the vapor stream into the burner system, converting the $SiO_2$ precursor into molten silica particles, and continuously depositing the molten silica particles to form a fused silica boule.

DESCRIPTION OF THE INVENTION

The conventional boule process used in making fused silica is a one-step process. In this process, a carrier gas is bubbled through a $SiCl_4$ feedstock that is maintained at a specified low temperature. The vaporous $SiCl_4$ is entrained in the carrier gas and is thereby transported to the reaction site. The reaction site is comprised of a number of burners that combust and oxidize the vaporous $SiCl_4$ to deposit silica at a temperature greater than 1600° C.

The principal requirements in the conventional process are that the apparatus and transfer system be capable of vaporizing the feedstock and delivering the vaporized feedstock to a burner in the vapor state. As described in the Dobbins et al. patent, the apparatus and process may remain substantially unchanged with one major exception. The $SiCl_4$ feedstock is replaced by a polymethylsiloxane. Use of this substitute feedstock may require some minor adjustments, such as a somewhat higher delivery temperature (e.g., 100°-150° C). This is due to the siloxane having a somewhat lower vapor pressure than $SiCl_4$.

Figure 1:
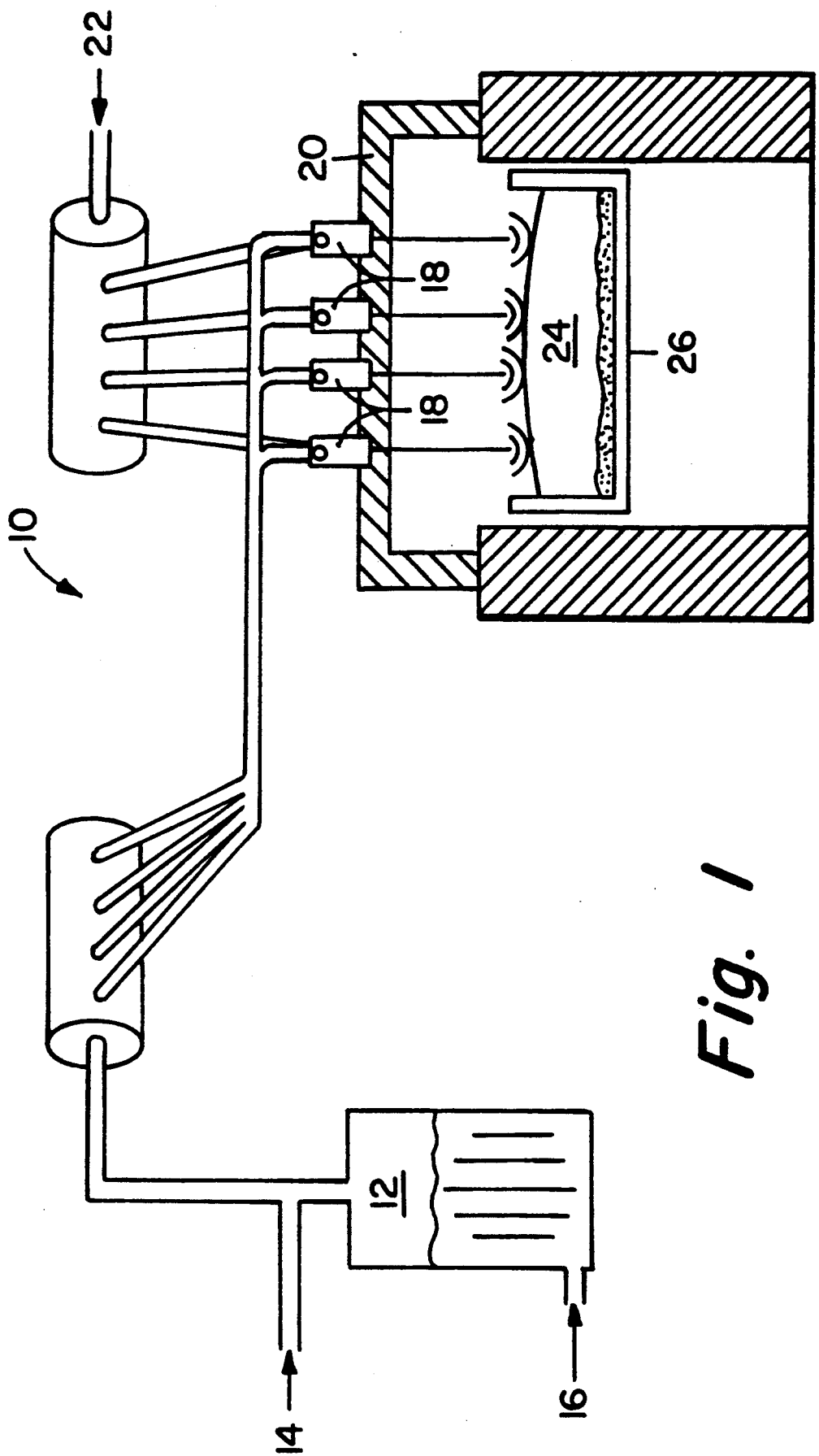
FIG. 1 in the accompanying drawing is a schematic representation of an apparatus and process for depositing a large body of fused silica.

FIG. 1 in the accompanying drawing is a schematic representation of an apparatus and process for producing and depositing molten silica particles to build up a large, fused silica boule. The apparatus, generally designated by the numeral 10, includes a feedstock source 12. Nitrogen, or a nitrogen/oxygen mixture, is used as the carrier gas. A bypass stream of nitrogen 14 is introduced to prevent saturation of the vaporous stream. The vaporous reactant is passed through a distribution mechanism to the reaction site wherein a number of burners 18 are present in close proximity to a furnace crown 20. The reactant is combined with a fuel/oxygen mixture 22 at these burners, and is combusted and oxidized to deposit silica at a temperature greater than 1600° C. High purity metal oxide soot and heat are directed downwardly through the refractory furnace crown 20. The silica is immediately deposited and consolidated to a non-porous mass 24 on hot cup 26.

A need for the present invention arose when an effort was made to employ a polymethylsiloxane (octamethylcyclosiloxane), rather than $SiCl_4$, in the system just described. It was found that the sodium ion content in the fused silica product increased by about ten-fold, that is, from values in the range of 50-150 ppb to values in the range of 500-1500 ppb. This led to studies designed to determine the source of the sodium contaminant and a means of controlling it.

Initially, the new feedstock was the suspect, but examination ruled it out as the sodium source. Attention was then directed to the furnace. Among other leads investigated were the refractories used in the fused silica furnace to collect the molten silica.

Parts of the furnace, in particular, the crown 20 and the cup 26, are sintered, porous, zircon bodies. In producing these refractory bodies, a batch is mixed containing primarily milled zircon powder and ground cork. The latter burns out during firing of the refractory product, thus producing a porous, lightweight body.

To produce the zircon batch, minor amounts of a dispersant and a binder are thoroughly mixed in hot water. Then the major constituents, the cork and the zircon, are added to the solution in a mixer to produce a pourable slurry. The slurry is then poured into molds and allowed to settle. The green bodies thus formed are then removed, dried and fired to burn out the cork and sinter the zircon body.

Studies revealed that the zircon refractories, primarily the furnace crown, were a major source of sodium in the fused silica. Sodium levels as high as 600-1000 ppm were determined to be present in the zircon refractory bodies.

Batch studies revealed that the primary source of sodium ion in the zircon refractory was not the zircon itself. Rather, the sources were the dispersant, the binder and the water used in preparing the zircon batch for molding. This led to substitution of ostensibly sodium-free materials in the batch.

Three sodium-free binders, namely, ammonium alginate, hydroxyethyl cellulose and hydroxypropyl methyl cellulose, were tested as substitutes for sodium alginate. Two sodium-free dispersants, supplied under designations Darvan 821A and TAMOL SG-i, were used in place of sodium silicate. Tap water was replaced by high purity, distilled water. No change was made in the major batch ingredients, the zircon powder and the cork.

The lowest sodium level (30 ppm) in the various molded and fired batches was found using a batch containing ammonium alginate and the Darvan dispersant. Accordingly, a production size batch using these materials was mixed, molded and fired. This batch consisted, in pounds, of:

| | |
|---|---|
| Milled zircon | 1000 |
| Powdered cork | 26-28 |
| Ammonium alginate | 1 |
| Darvan 821A | 2 |
| Hot DI water | 150 |
| Cold DI water | 36-42 |

Porous zircon refractories, produced from the foregoing batch, were used in constructing the crown and cup of both a prototype and a commercial size fused silica furnace. Sodium levels less than 100 ppb were found in a substantial portion of the fused silica boules formed in these furnaces.

There remained the interesting question as to why the zircon refractories should contribute such greater sodium contamination with the new feedstock. It is now surmised that sodium ions have always been introduced from the zircon refractories. However, HCl is generated as a byproduct when $SiCl_4$ is used as a feedstock.

It appears that the HCl evolved acts as an excellent agent for cleaning the furnace refractories of metal contaminants. Of course, the purpose of switching to a polymethylsiloxane was to avoid evolution and emission of HCl. Consequently, it now becomes necessary to use cleaner refractory materials, in particular, zircon refractory bodies with minimal sodium ion content.

Figure 2:
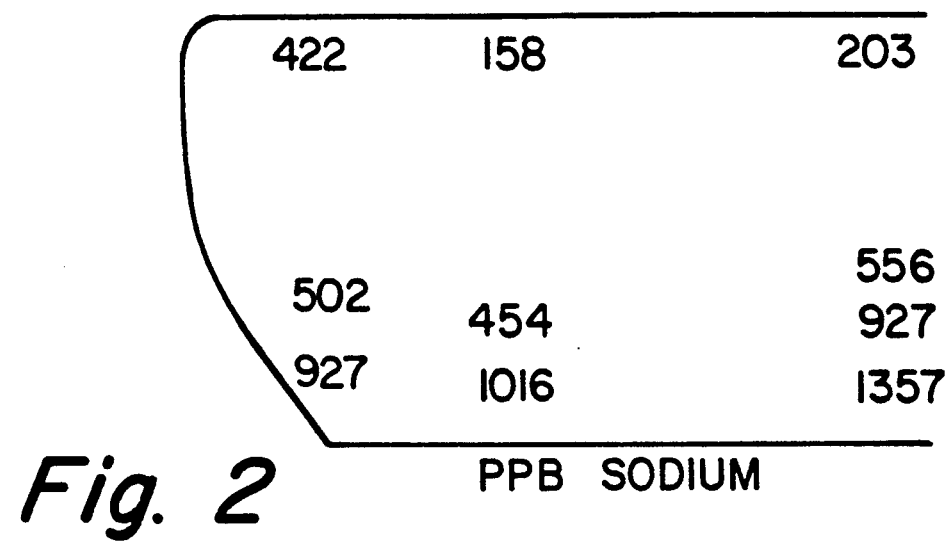
FIGS. 2, 3 and 4 are partial, schematic views in cross-section of a fused silica boule illustrating certain characteristics of a fused silica boule produced in accordance with the present invention.
Figure 3:
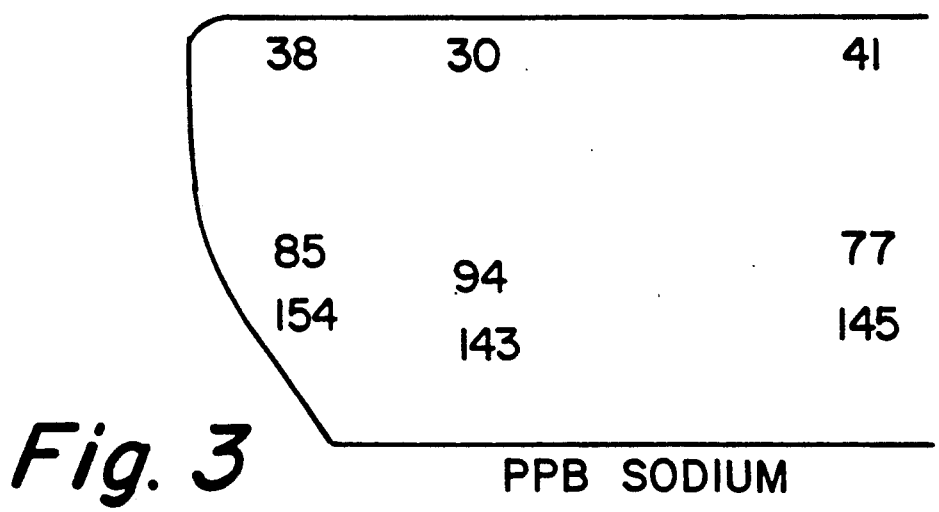

FIGS. 2 and 3 are partial schematic views in cross-section of fused silica boules showing the sodium ion levels found by analysis at various levels in the boules produced with the new polymethylsiloxane feedstock. FIG. 2 illustrates a boule deposited using a furnace constructed with prior zircon refractories, that is, refractories produced with sodium-containing dispersants and binders. FIG. 3 corresponds to FIG. 2, but illustrates a boule deposited using a furnace constructed with zircon refractories produced according to the present invention.

It has further been found that reduction of sodium ion content in the zircon refractory, and consequently in the fused silica produced with such refractory, has a positive effect on UV transmission of the fused silica product. This property is important, for example, in lenses used in excimer-based microlithography systems. Such lenses require a prescribed degree of ultraviolet radiation transmission, for example, 85% in accordance with one standard.

Figure 4:
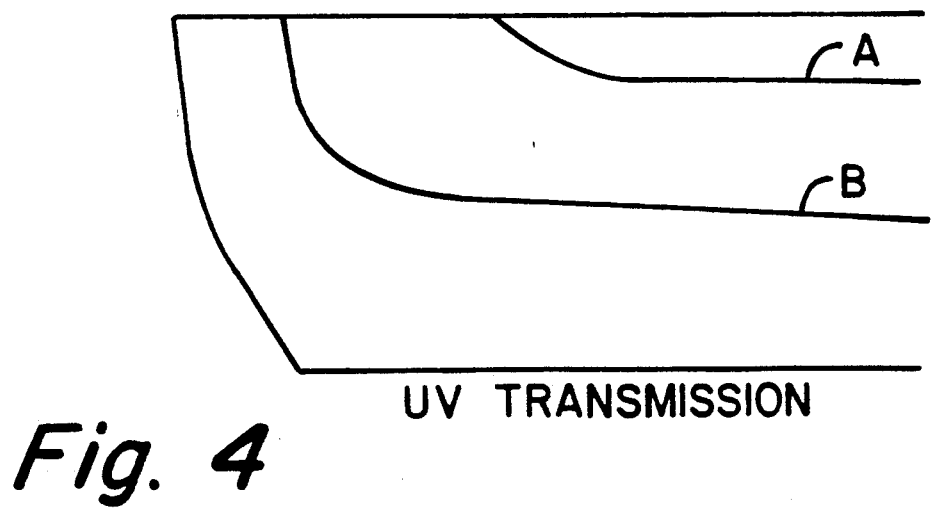

FIG. 4 is also a partial schematic representation of a boule in cross-section. It shows the portion of a boule that will provide the standard 85% UV transmission (15% includes reflection loss). The portion of the boule above curve A represents the usable portion provided by a boule deposited in a furnace constructed using prior zircon refractory bodies: that is, bodies prepared with sodium-containing additives. The portion of the boule above curve B represents the usable portion of a boule produced in a furnace constructed with zircon refractories produced in accordance with the present invention.

We claim:

1. A fired, porous, zircon refractory body consisting essentially of zircon and having a sodium ion content, as an impurity, of less than 30 ppm.

2. A refractory body in accordance with claim 1 wherein the body is a crown for a furnace for making fused silica.

3. A refractory body in accordance with claim 1 wherein the body is a cup for a furnace for making fused silica.

4. A furnace for production of fused silica by forming and collecting molten fused silica particles, at least a portion of the furnace being constructed of fired, porous, refractory bodies consisting essentially of zircon and having a sodium ion content, as an impurity, of less than 30 ppm.

5. A furnace in accordance with claim 4 wherein the portion of the furnace constructed of porous zircon refractory bodies includes at least the crown of the furnace.

* * * * *